(12) United States Patent
Todaka et al.

(10) Patent No.: US 11,583,803 B2
(45) Date of Patent: Feb. 21, 2023

(54) REDUCING AGENT SUPPLY DEVICE AND DENITRATION DEVICE

(71) Applicant: Mitsubishi Power, Ltd., Yokohama (JP)

(72) Inventors: Shimpei Todaka, Tokyo (JP); Hideo Miyanishi, Yokohama (JP); Kazuhiko Sera, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 63 days.

(21) Appl. No.: 17/424,534

(22) PCT Filed: Nov. 28, 2019

(86) PCT No.: PCT/JP2019/046567
§ 371 (c)(1),
(2) Date: Jul. 21, 2021

(87) PCT Pub. No.: WO2020/158146
PCT Pub. Date: Aug. 6, 2020

(65) Prior Publication Data
US 2022/0062823 A1 Mar. 3, 2022

(30) Foreign Application Priority Data
Jan. 30, 2019 (JP) .............................. JP2019-013739

(51) Int. Cl.
*B01D 53/86* (2006.01)
*B01D 53/90* (2006.01)

(52) U.S. Cl.
CPC ......... *B01D 53/90* (2013.01); *B01D 53/8631* (2013.01); *B01D 2251/2062* (2013.01); *B01D 2257/404* (2013.01); *B01D 2258/0283* (2013.01)

(58) Field of Classification Search
CPC ................ B01D 53/90; B01D 53/8631; B01D 2251/2062; B01D 2257/404; B01D 2258/2083; B05B 1/00; B05B 1/14
See application file for complete search history.

(56) References Cited

U.S. PATENT DOCUMENTS

| 6,110,440 A | 8/2000 | Ohta et al. |
| 7,383,850 B2 | 6/2008 | Buzanowski et al. |

(Continued)

FOREIGN PATENT DOCUMENTS

| CN | 103765104 A | 4/2014 |
| CN | 106955593 A | 7/2017 |

(Continued)

OTHER PUBLICATIONS

International Search Report dated Mar. 3, 2020, issued in counterpart Application No. PCT/JP2019/046567. (10 pages).

(Continued)

*Primary Examiner* — Timothy C Vanoy
(74) *Attorney, Agent, or Firm* — WHDA, LLP (57) ABSTRACT

A reducing agent supply device for supplying a reducing agent to a portion of a passage for a flue gas upstream of a SCR catalyst includes at least one header pipe extending in the passage and configured to allow the reducing agent to pass through; a plurality of injection nozzles disposed on the header pipe at intervals along an extension direction of the header pipe and configured to inject the reducing agent into the passage; a heat shield plate disposed on an upstream side of the header pipe with respect to a flow direction of the flue gas and having a longitudinal direction along the extension direction of the header pipe; and at least one fixing part contacting each of the heat shield plate and the header pipe and fixing the heat shield plate to the header pipe.

12 Claims, 6 Drawing Sheets

(56) References Cited

U.S. PATENT DOCUMENTS

| | | |
|---|---|---|
| 2005/0002843 A1 | 1/2005 | Kim et al. |
| 2006/0157132 A1 | 7/2006 | Buzanowski et al. |
| 2009/0293721 A1 | 12/2009 | Miller et al. |
| 2014/0363357 A1 | 12/2014 | Trivedi et al. |

FOREIGN PATENT DOCUMENTS

| | | | | |
|---|---|---|---|---|
| CN | 208372832 U | | 1/2019 | |
| CN | 110 585 887 A | * | 12/2019 | ............. B01D 53/79 |
| CN | 110 860 200 A | * | 3/2020 | ............. B01D 53/56 |
| CN | 113 926 300 A | * | 1/2022 | ............. B01D 53/79 |
| CN | 114 534 485 A | * | 5/2022 | ......... B01D 53/8631 |
| DE | 3728557 A1 | | 3/1989 | |
| EP | 0 718 027 A1 | * | 6/1996 | ........... B01D 53/885 |
| JP | S53-063266 A | | 6/1978 | |
| JP | S54-100109 U | | 7/1979 | |
| JP | S54-139045 U | | 9/1979 | |
| JP | S55-95824 U | | 7/1980 | |
| JP | S60-193222 U | | 12/1985 | |
| JP | H05-220342 A | | 8/1993 | |
| JP | H07-39724 A | | 2/1995 | |
| JP | H10-002220 A | | 1/1998 | |
| JP | 2011-106413 A | | 6/2011 | |
| JP | 2017-150790 A | | 8/2017 | |
| TW | M372390 U1 | | 1/2010 | |
| WO | WO 2019 040 786 A2 | * | 2/2019 | ............. B01D 47/06 |

OTHER PUBLICATIONS

Notification of Transmittal of Translation of the International Preliminary Report on Patentability (Form PCT/IB/338) issued in counterpart International Application No. PCT/JP2019/046567 dated Aug. 12, 2021, with Forms PCT/IB/373, PCT/ISA/237 and PCT/IB/326, with English translation. (15 pages).

Office Action dated Jun. 29, 2020, issued in counterpart TW Application No. 108145672. (7 pages).

Extended European Search Report dated Jan. 14, 2022, issued in counterpart to EP application No. 19913700.1. (9 pages).

* cited by examiner

Upstream ——————→ Downstream
Flue gas flow direction

FIG. 5

Upstream ——————→ Downstream
Flue gas flow direction

REDUCING AGENT SUPPLY DEVICE AND DENITRATION DEVICE

TECHNICAL FIELD

The present invention relates to a reducing agent supply device and a denitration device.

BACKGROUND

Conventionally, for example, in order to remove NOx from combustion flue gas of fossil fuel or the like, a denitration device configured to promote the reaction using a denitration catalyst (e.g., SCR catalyst) by mixing a reducing agent such as ammonia into the flue gas is known. For example. Patent Document 1 discloses a technique for efficiently mixing ammonia into flue gas by shaping an ammonia supply pipe extending in a flue gas passage to have a sharp end facing upstream in the flue gas flow direction.

CITATION LIST

Patent Literature

Patent Document 1: U.S. Pat. No. 7,383,850B

SUMMARY

Problems to be Solved

The denitration catalyst as described above is generally arranged over the entire width in the width direction of the flue gas passage. For this reason, multiple nozzles are arranged in the ammonia supply pipe at intervals in the extension direction of the supply pipe to allow ammonia to pass through the catalyst with a uniform concentration distribution in a direction intersecting the flue gas flow direction. However, the supply pipe is supplied with ammonia which is generally cooler than hot flue gas, and the heat from the flue gas causes ammonia circulating in the supply pipe to heat up and expand. In this case, a nozzle on the distal end side of the supply pipe injects ammonia at a higher temperature and a lower concentration than ammonia injected from a nozzle on the proximal end side of the same. Therefore, downstream of the supply pipe in the flue gas passage, the concentration distribution of ammonia in the width direction of the flue gas passage is non-uniform, and the denitration performance of the denitration catalyst disposed downstream of the flue gas passage may deteriorate.

In this regard. Patent Document 1 does not disclose any knowledge of the influence of the heat of the flue gas transferred to ammonia in the ammonia supply pipe extending in the flue gas passage.

In view of the above, an object of at least one embodiment of the present invention is to provide a reducing agent supply device or a denitration device that can equalize the concentration distribution of a reducing agent supplied in a flue gas passage in a direction intersecting the flow direction.

Solution to the Problems (1) A reducing agent supply device according to at least one embodiment of the present invention is a reducing agent supply device for supplying a reducing agent to a portion of a passage for a flue gas upstream of a SCR catalyst, comprising: at least one header pipe extending in the passage and configured to allow the reducing agent to pass through; a plurality of injection nozzles disposed on the header pipe at intervals along an extension direction of the header pipe and configured to inject the reducing agent into the passage; a heat shield plate disposed on an upstream side of the header pipe with respect to a flow direction of the flue gas and having a longitudinal direction along the extension direction of the header pipe; and at least one fixing part contacting each of the heat shield plate and the header pipe and fixing the heat shield plate to the header pipe. The at least one fixing part is disposed in at least one position in the extension direction of the header pipe.

With the above configuration (1), since the heat shield plate is disposed on the upstream side of the header pipe extending in the flue gas passage with respect to the flue gas flow direction, and the fixing part fixing the heat shield plate to the header pipe is disposed in at least one position in the extension direction of the header pipe, heat transferred from the flue gas to the header pipe directly or indirectly can be significantly reduced. Accordingly, heat transferred to the reducing agent in the header pipe can be significantly reduced, so that the temperature variation of the reducing agent between the proximal end and distal end sides of the header pipe can be reduced. Thus, since the concentration distribution of the reducing agent in a direction intersecting the flow direction of the flue gas can be equalized, it is possible to suppress a reduction in denitration performance of the SCR catalyst disposed downstream of the reducing agent supply device in the flue gas passage.

(2) In some embodiments, in the above configuration (1), the at least one fixing part may include at least one spot weld part fixing the heat shield plate and the header pipe with a spot-like welding mark.

With the above configuration (2), since the fixing part connecting the heat shield plate and the header pipe includes a spot weld part fixing the heat shield plate and the header pipe with a spot-like welding mark, heat transferred from the heat shield plate to the header pipe can be significantly reduced compared with the case where the heat shield plate and the header pipe are fixed with continuous welding marks in the extension direction of the header pipe.

(3) In some embodiments, in the above configuration (1), the at least one fixing part may include at least one band part fixing the heat shield plate and the header pipe by connecting one end portion and another end portion of the heat shield plate in a transverse direction so as to span the header pipe.

With the above configuration (3), since the heat shield plate is connected to the header pipe by the band part at one end portion and the other end portion in the transverse direction of the heat shield plate, the contact area between the heat shield plate and the header pipe can be reduced. Accordingly, heat transferred from the heat shield plate to the header pipe is reduced, and the temperature increase of the reducing agent flowing in the header pipe is suppressed.

(4) In some embodiments, in any one of the above configurations (1) to (3), the heat shield plate may be formed in a flat plate shape.

With the above configuration (4), by adopting the heat shield plate in a flat plate shape, the heat shield plate that functions as a heat shield against the flue gas can be obtained with a simple configuration.

(5) In some embodiments, in any one of the above configurations (1) to (3), the heat shield plate may include: a one-side flat plate portion that is inclined to one side intersecting the flow direction as viewed from the extension direction of the header pipe; and an other-side flat plate portion that is inclined to another side intersecting the flow direction and has an upstream end, with respect to the flow direction, continuous with the one-side flat plate portion as viewed from the extension direction of the header pipe.

With the above configuration (5), since the one-side flat plate portion and the other-side flat plate portion are included, the heat shield plate is connected to the header pipe in a form that is sharp upstream in the flue gas flow direction, i.e., that expands downstream in the flow direction. Accordingly, it is possible to reduce the pressure loss of the flue gas due to the heat shield plate.

(6) In some embodiments, in an one of the above configurations (1) to (3), the heat shield plate may be formed in an arc shape that is convex upstream with respect to the flow direction.

With the above configuration (6), since the arc-shaped heat shield plate is connected to the header pipe so as to be convex upstream in the flow direction, it is possible to reduce the pressure loss of the flue gas due to the heat shield plate.

(7) In some embodiments, in any one of the above configurations (1) to (3), the heat shield plate may include: a first flat plate portion along a direction intersecting the flow direction as viewed from the extension direction of the header pipe; a second flat plate portion that is continuous with one end of the first flat plate portion in the direction intersecting the flow direction and is inclined downstream with respect to the flow direction from the one end; and a third flat plate portion that is continuous with another end of the first flat plate portion in the direction intersecting the flow direction and is inclined downstream with respect to the flow direction from the another end.

With the above configuration (7), since the second flat plate portion and the third flat plate portion are inclined downstream in the flow direction so as to expand downstream in the flow direction, it is possible to reduce the pressure loss of the flue gas due to the heat shield plate.

(8) In some embodiments, in any one of the above configurations (1) to (7), the heat shield plate may have a greater width than the header pipe in a direction perpendicular to the flow direction and to the extension direction of the header pipe.

With the above configuration (8), it is possible to significantly reduce the flue gas that directly impinges on the header pipe in the flue gas passage. Accordingly, heat transferred to the header pipe from the flue gas, which is generally hotter than the reducing agent flowing in the header pipe, can be significantly reduced.

(9) In some embodiments, in any one of the above configurations (1) to (8), the at least one header pipe may include a plurality of header pipes arranged at intervals in a direction perpendicular to the flow direction and to the extension direction of the header pipe.

With the above configuration (9), since the header pipes are arranged at intervals in a direction intersecting the flue gas flow direction, the concentration distribution of the reducing agent in the direction intersecting the flue gas flow direction can be equalized in the flue gas passage.

(10) In some embodiments, in any one of the above configurations (1) to (9), the plurality of injection nozzles may include a first injection nozzle, and a second injection nozzle disposed downstream of the first injection nozzle with respect to a passage direction of the reducing agent in the extension direction of the header pipe, the second injection nozzle having a larger nozzle diameter than a nozzle diameter of the first injection nozzle.

With the above configuration (10), a larger amount of the reducing agent can be injected into the flue gas passage on the downstream side than on the upstream side in the passage direction of the reducing agent in the header pipe. As a result, even if the reducing agent passing through the header pipe is heated by the heat of the flue gas, and the concentration of the reducing agent on the downstream side is lower than that of the reducing agent on the upstream side, the amount of the reducing agent injected from the upstream injection nozzle and the amount of the reducing agent from the downstream injection nozzle can be equalized. Thus, the concentration distribution of the reducing agent injected from the injection nozzles can be equalized in a direction intersecting the flue gas flow direction.

(11) In some embodiments, in any one of the above configurations (1) to (10), at least one of the header pipe or the heat shield plate may be configured to have a higher thermal conductivity on a downstream side than on an upstream side with respect to a passage direction of the reducing agent in the extension direction of the header pipe.

With the above configuration (11), since at least one of the header pipe or the heat shield plate is configured to have a higher thermal conductivity on the downstream side than on the upstream side in the passage direction of the reducing agent, the temperature difference of the reducing agent in the extension direction of the header pipe can be reduced.

(12) A denitration device according to at least one embodiment of the present invention comprises: the reducing agent supply device described in any one of the above (1) to (11); and a SCR catalyst configured to remove a NOx component in a flue gas by a reducing agent supplied from the reducing agent supply device.

With the above configuration (12), since the reducing agent supply device configured to inject the reducing agent with a uniform concentration distribution in a direction intersecting the flue gas flow direction is included, it is possible to provide a denitration device that can suppress a reduction in denitration performance of the SCR catalyst disposed downstream of the reducing agent supply device.

Advantageous Effects

At least one embodiment of the present invention provides a reducing agent supply device or a denitration device that can equalize the concentration distribution of a reducing agent supplied in a flue gas passage in a direction intersecting the flow direction.

DETAILED DESCRIPTION

Embodiments of the present invention will now be described in detail with reference to the accompanying drawings. It is intended, however, that unless particularly identified, dimensions, materials, shapes, relative positions, and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

First, a denitration device according to at least one embodiment of the present invention will be described.

Figure 1:
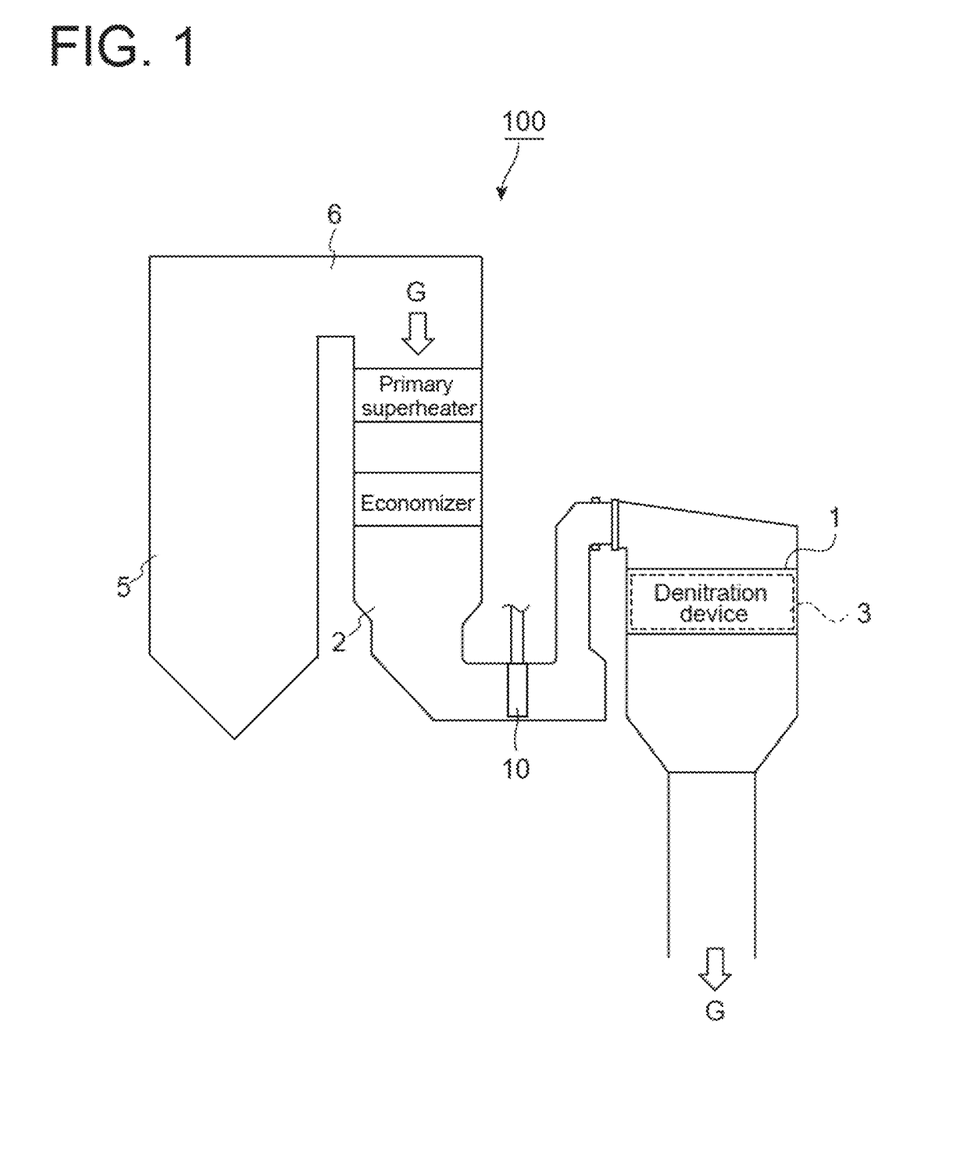
FIG. 1 is a schematic diagram showing a configuration of a downstream portion of a flue gas passage of a boiler system to which a denitration device according to an embodiment of the present invention is applied.

FIG. 1 is a schematic diagram showing a configuration of a downstream portion of a flue gas passage of a boiler system to which a denitration device according to an embodiment of the present invention is applied.

In the following, the case where a denitration device 1 is disposed in a flue gas passage 2 of a coal-fired boiler (boiler 4) will be described as an example. The boiler 4 includes a furnace 5, a combustion device (not illustrated), and a duct 6 connected to the flue gas passage 2 shown in FIG. 1.

As illustrated in FIG. 1, the denitration device 1 includes a SCR catalyst 3 disposed so as to extend along a direction intersecting the flow direction of the flue gas G (i.e., the width direction of the flue gas passage 2) on the downstream side in the flue gas passage 2 for the flue gas G discharged from the boiler 4, and a reducing agent supply device 10 for supplying a reducing agent (e.g., anhydrous ammonia, ammonia water, urea, urea water, or a mixture of at least one of these and air) upstream of the SCR catalyst 3 in the flue gas passage 2. In the following description, ammonia (more specifically, a mixture of ammonia and air) is sprayed into the flue gas G as an example of the reducing agent.

The SCR catalyst 3 is a denitration catalyst used in a selective catalytic reduction (SCR) denitration system, and is configured to remove NOx components in the flue gas G by promoting the reaction between, for example, nitrogen oxides (NOx) in the flue gas G produced by the combustion of carbon-containing fuel and the reducing agent supplied from the reducing agent supply device 10. Although detailed description of the SCR catalyst 3 is omitted, the SCR catalyst 3 uses various ceramics and titanium oxides as a carrier, for example.

The reducing agent supply device 10 is a device for injecting the reducing agent into the flue gas passage 2. The reducing agent supply device 10 described in the present disclosure is configured to inject ammonia such that the ammonia concentration distribution is uniform in a direction intersecting the flow direction of the flue gas G.

With the configuration including the reducing agent supply device 10 configured to inject ammonia with a uniform concentration in a direction intersecting the flow direction of the flue gas G, it is possible to provide the denitration device 1 that can suppress a reduction in denitration performance of the SCR catalyst 3 disposed downstream of the reducing agent supply device 10 due to an unbalanced ammonia concentration distribution.

Next, the reducing agent supply device 10 according to at least one embodiment of the present invention will be described.

Figure 2:
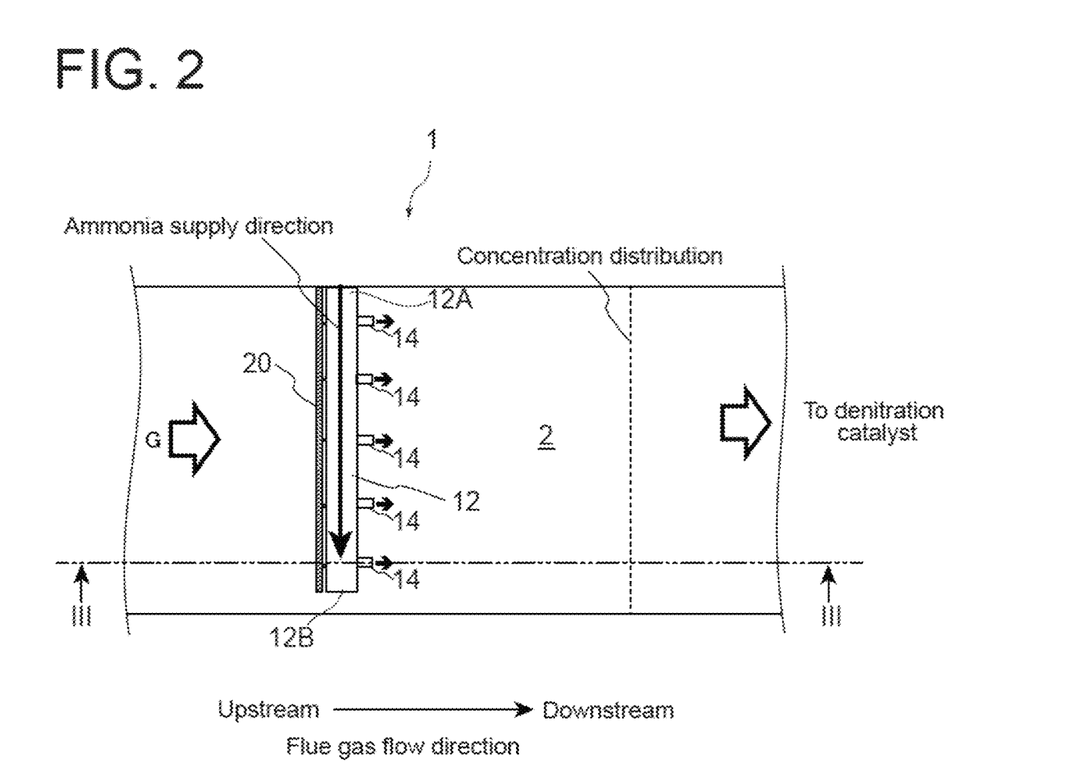
FIG. 2 is a cross-sectional side view schematically showing a configuration of a reducing agent supply device according to an embodiment.
Figure 3:
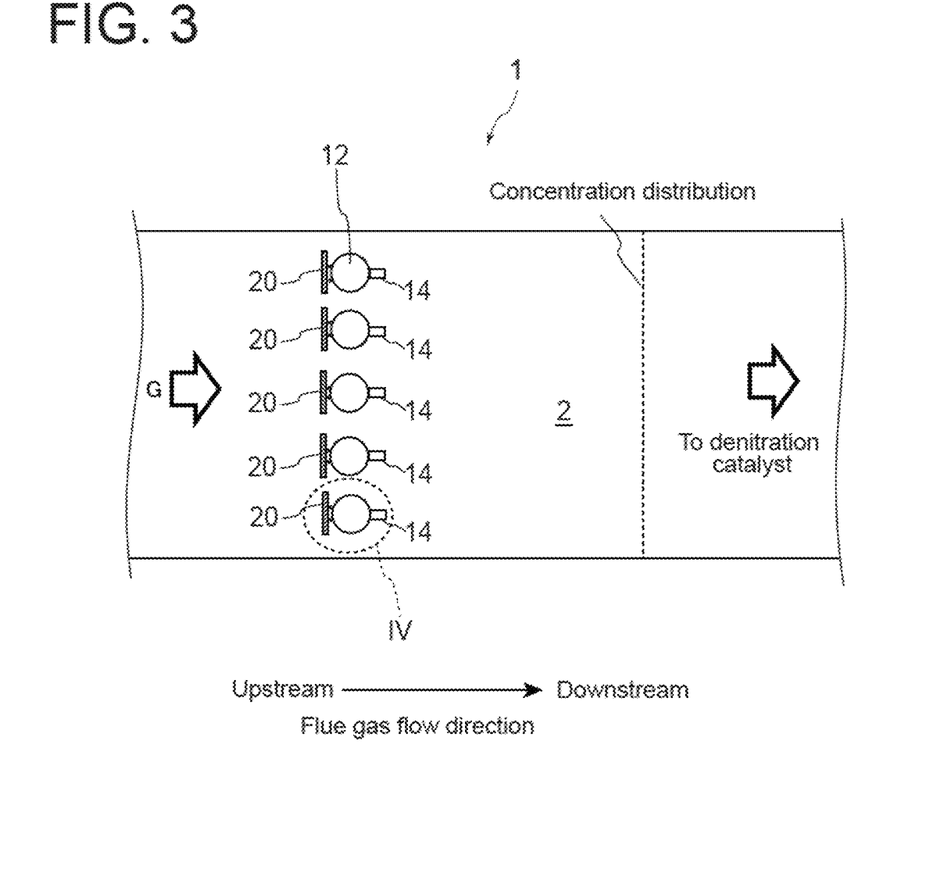
FIG. 3 is a cross-sectional view schematically showing a configuration of a reducing agent supply device according to an embodiment, taken along line III-III in FIG. 2.

FIG. 2 is a cross-sectional side view schematically showing a configuration of a reducing agent supply device according to an embodiment. FIG. 3 is a cross-sectional view schematically showing a configuration of a reducing agent supply device according to an embodiment, taken along line III-III in FIG. 2.

As illustrated in FIGS. 2 and 3, the reducing agent supply device 10 according to at least one embodiment of the present invention is also referred to as an ammonia injection device or an ammonia injection grid (AIG), and includes at least one header pipe 12 extending in the flue gas passage 2 and configured to allow ammonia to pass through, a plurality of injection nozzles 14 disposed on the header pipe 12 at intervals along the extension direction of the header pipe 12 and configured to inject ammonia into the flue gas passage 2, a heat shield plate 20 disposed on the upstream side of the header pipe 12 with respect to the flow direction of the flue gas G and having a longitudinal direction along the extension direction of the header pipe 12, and at least one fixing part 30 contacting each of the heat shield plate 20 and the header pipe 12 and fixing the heat shield plate 20 to the header pipe 12.

The header pipe 12 is a conduit for guiding the reducing agent from outside the flue gas passage 2 into the flue gas passage 2 and supplying it to the plurality of injection nozzles 14. The header pipe 12 is a hollow cylindrical pipe and extends in the flue gas passage 2, for example, perpendicular to the pipe wall of the duct that constitutes the flue gas passage 2. The header pipe 12 may extend in the flue gas passage 2 over the entire width of the flue gas passage 2, or may be arranged such that the distal end 12B (the downstream end in the passage direction of the reducing agent flowing in the header pipe 12) is located in the flue gas passage 2.

Each of the injection nozzles 14 is disposed on the header pipe 12 at the downstream side of the header pipe 12 in the flow direction of the flue gas G, and is designed to inject the reducing agent downstream. For example, the injection nozzles 14 may be arranged at equal intervals along the extension direction of the header pipe 12.

The heat shield plate 20 is composed of a material (e.g., ceramic plate or stainless) having a lower thermal conductivity than the header pipe 12 and the injection nozzles 14. The heat shield plate 20 can be of various shapes and forms as described below. The heat shield plate 20 prevents the flue gas G flowing from upstream in the flue gas passage 2 from directly impinging on the header pipe 12.

The at least one fixing part 30 is disposed in at least one position in the extension direction of the header pipe 12. The length or width of the fixing part 30 along the extension direction of the header pipe 12 is shorter than the length of the header pipe 12. In the case where multiple fixing parts are disposed, they are separated from each other in the extension direction of the header pipe 12 and arranged at intervals. For example, the fixing part 30 may be disposed in one or several positions along the extension direction of the header pipe 12 so that the heat shield plate 20 is supported by the header pipe 12. In the case where the heat shield plate 20 is configured to be mainly supported by the duct or a structure other than the duct, for example, the fixing part 30 may be disposed in one position in the extension direction of the header pipe 12. In other words, as few fixing parts 30 as possible can be provided to the extent that they do not interfere with the operation of the boiler system 100 so that the amount of heat transferred from the heat shield plate 20 to the header pipe 12 can be controlled as much as possible. The fixing part 30 may include a plurality of fixing parts 30 that are at the same location in the extension direction of the header pipe 12 and at different locations in the circumferential direction of the header pipe 12, as necessary.

As described above, since the heat shield plate 20 is disposed on the upstream side of the header pipe 12 extending in the passage 2 of the flue gas G with respect to the flow direction of the flue gas G, and the fixing part 30 fixing the heat shield plate 20 to the header pipe 12 is disposed in at least one position in the extension direction of the header pipe 12, heat transferred from the flue gas G to the header pipe 12 directly or indirectly can be significantly reduced. Accordingly, heat transferred to ammonia in the header pipe 12 can be significantly reduced, so that the temperature variation of ammonia between the proximal end 12A and distal end 12B sides of the header pipe 12 can be reduced. Thus, since the concentration distribution of ammonia is prevented from becoming uneven in the pipe width direction of the flue gas passage 2 (flue gas duct or combustion gas duct), and the concentration distribution of ammonia in a direction intersecting the flow direction of the flue gas G can be equalized, it is possible to suppress a reduction in denitration performance of the SCR catalyst 3 disposed downstream of the reducing agent supply device 10 in the passage 2 of the flue gas G.

In any one of the above configurations, in some embodiments, for example as illustrated in FIG. 3, the at least one header pipe 12 may include a plurality of header pipes 12 arranged at intervals in a direction intersecting or perpendicular to the flow direction of the flue gas G and the extension direction of the header pipe 12. In this case, the header pipes 12 may be arranged at equal intervals along a direction intersecting the flow direction and the extension direction of the header pipe 12, for example, and may be parallel to each other.

Thus, with the configuration in which the header pipes 12 are arranged at intervals in a direction intersecting the flow direction of the flue gas G and the extension direction of the header pipe 12, the concentration distribution of ammonia in the direction intersecting the flow direction of the flue gas G can be equalized in the passage 2 of the flue gas G.

Figure 4:
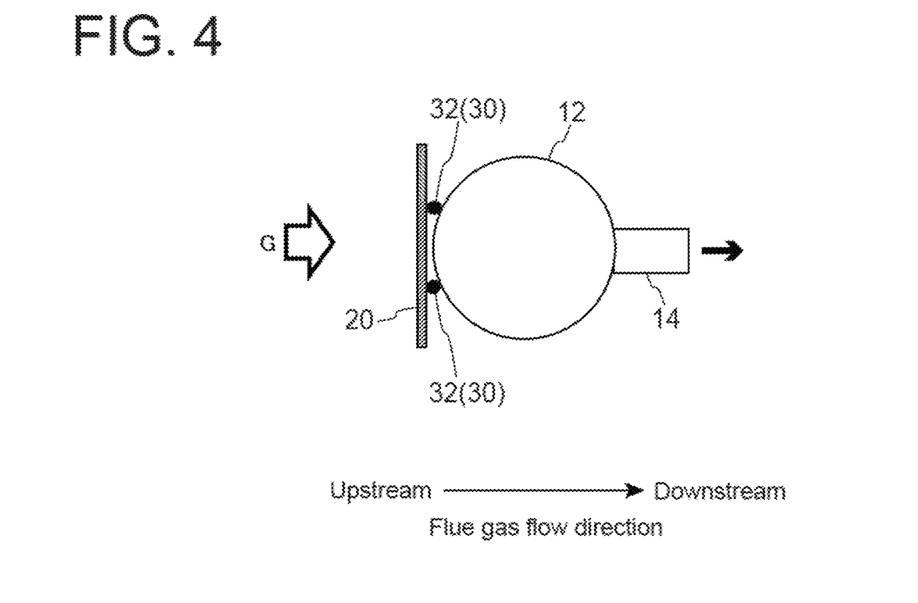
FIG. 4 is a plan view showing a heat shield plate and a fixing part according to an embodiment and is an enlarged view of part IV in FIG. 3.

FIG. 4 is a plan view showing a heat shield plate and a fixing part according to an embodiment and is an enlarged view of part IV in FIG. 3.

In any one of the above configurations, in some embodiments, for example as illustrated in FIG. 4, the at least one fixing part 30 may include at least one spot weld part 32 fixing the heat shield plate 20 and the header pipe 12 with a spot-like welding mark.

Thus, with the configuration in which the fixing part 30 connecting the heat shield plate 20 and the header pipe 12 includes the spot weld part 32 fixing the heat shield plate 20 and the header pipe 12 with a spot-like welding mark, heat transferred from the heat shield plate 20 to the header pipe 12 can be significantly reduced compared with the case where the heat shield plate 20 and the header pipe 12 are fixed with continuous welding marks in the extension direction of the header pipe 12.

Figure 5:
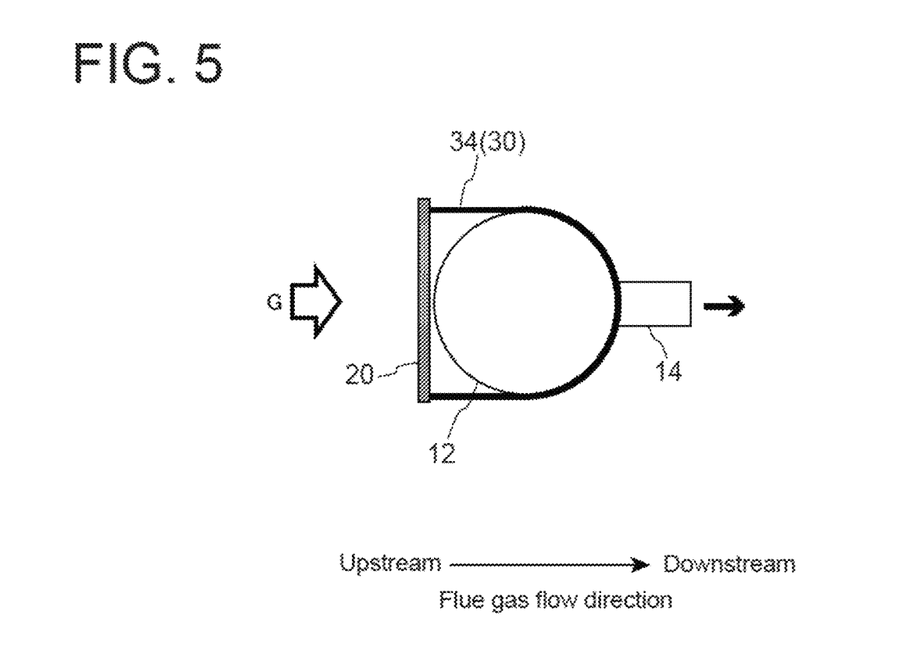
FIG. 5 is a plan view showing a heat shield plate and a fixing part according to an embodiment.

FIG. 5 is a plan view showing a heat shield plate and a fixing part according to an embodiment.

In any one of the above configurations, in some embodiments, for example as illustrated in FIG. 5, the at least one fixing part may include at least one band part 34 fixing the heat shield plate 20 and the header pipe 12 by connecting one end portion 20A and the other end portion 20B of the heat shield plate 20 in the transverse direction so as to span the header pipe 12.

The band part 34 may be a member having a U-shape, channel shape, or horseshoe shape as viewed from the extension direction of the header pipe 12. The band part 34 may have a length in the extension direction of the header pipe 12 significantly shorter than the length of the header pipe 12, and may have as short a width as possible in the extension direction of the header pipe 12. Several band parts 34 may be arranged at equal intervals along the extension direction of the header pipe 12, for example. Further, the band part 34 may be made of a material having a lower thermal conductivity than that of the header pipe 12. Both ends of the band part 34 may be each connected to the heat shield plate 20 by the spot weld part 32.

Thus, with the configuration in which the heat shield plate 20 is connected to the header pipe 12 by the band part 34 at one end portion 20A and the other end portion 20B in the transverse direction of the heat shield plate 20, the contact area between the heat shield plate 20 and the header pipe 12 can be reduced. Accordingly, heat transferred from the heat shield plate 20 to the header pipe 12 is reduced, and the temperature increase of ammonia flowing in the header pipe 12 is suppressed.

In some embodiments, for example as illustrated in FIGS. 3 to 5, the heat shield plate 20 may be formed in a flat plate shape.

In this case, the heat shield plate 20 may extend in the flue gas passage 2 such that the transverse direction thereof is perpendicular to the pipe wall of the combustion gas duct or the duct that constitutes the flue gas passage 2, for example. The plate thickness of the heat shield plate 20 is not particularly limited. For example, the heat shield plate 20 may have a smaller thickness than the outer diameter of the header pipe 12. The heat shield plate 20 may be configured to be symmetrically arranged with respect to an imaginary line connecting the upstream and downstream of the flue gas passage 2 through the pipe axis of the header pipe 12, for example.

By adopting the heat shield plate 20 in a flat plate shape, the heat shield plate 20 that functions as a heat shield member against the flue gas G can be obtained with a simple configuration.

Figure 6:
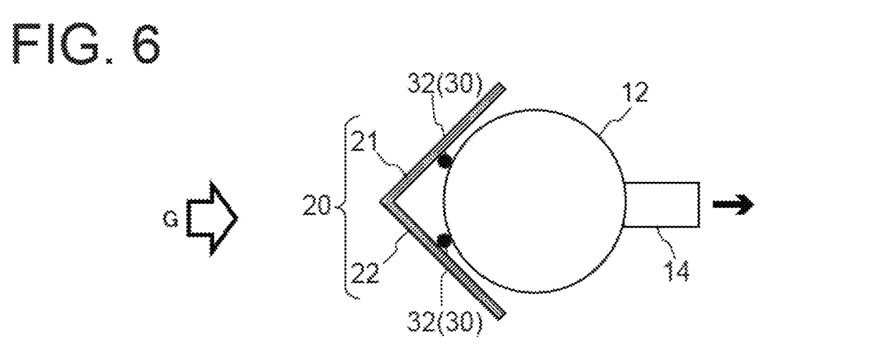
FIG. 6 is a plan view showing a heat shield plate and a fixing part according to another embodiment.

FIG. 6 is a plan view showing a heat shield plate and a fixing part according to another embodiment.

In some embodiments, for example as illustrated in FIG. 6, the heat shield plate 20 may include a one-side flat plate portion 21 that is inclined with respect to the flow direction of the flue gas G to one side intersecting the flow direction as viewed from the extension direction of the header pipe 12, and an other-side flat plate portion 22 that is inclined with respect to the flow direction to another side intersecting the flow direction and has an upstream end 21A, with respect to the flow direction of the flue gas G, continuous with the one-side flat plate portion 21 as viewed from the extension direction of the header pipe 12.

In other words, the heat shield plate 20 may include a V-shaped or L-shaped member (e.g., an angle member) that expands downstream in the flow direction of the flue gas G as viewed from the extension direction of the header pipe 12. In this case, the heat shield plate 20 may be configured to be symmetrically arranged with respect to an imaginary line connecting the upstream and downstream of the flue gas passage 2 through the pipe axis of the header pipe 12, for example.

Thus, with the configuration in which the heat shield plate 20 includes the one-side flat plate portion 21 and the other-side flat plate portion 22, the heat shield plate 20 is connected to the header pipe 12 in a form that expands downstream in the flow direction of the flue gas G, i.e., that is sharp upstream in the flow direction. Accordingly, it is possible to reduce the pressure loss of the flue gas G due to the heat shield plate 20.

Figure 7:
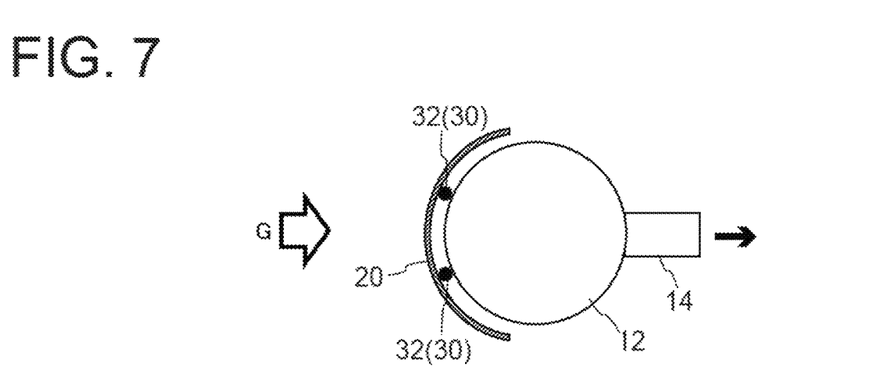
FIG. 7 is a plan view showing a heat shield plate and a fixing part according to another embodiment.

FIG. 7 is a plan view showing a heat shield plate and a fixing part according to another embodiment.

In some embodiments, for example as illustrated in FIG. 7, the heat shield plate 20 may be formed in an arc shape that is convex upstream with respect to the flow direction of the flue gas G.

That is, the heat shield plate 20 may be a member having an arc shape U-shape, channel shape, or horseshoe shape that expands downstream in the flow direction of the flue gas G as viewed from the extension direction of the header pipe 12. In this case, the heat shield plate 20 may be symmetrically arranged with respect to an imaginary line passing through the pipe axis of the header pipe 12 along the flow direction of the flue gas G, for example.

Thus, by connecting the heat shield plate 20 of semi-cylindrical shape with an axial direction along the extension direction of the header pipe 12 to the header pipe 12 so as to be convex upstream in the flow direction of the flue gas G, it is possible to reduce the pressure loss of the flue gas G due to the heat shield plate 20.

Figure 8:
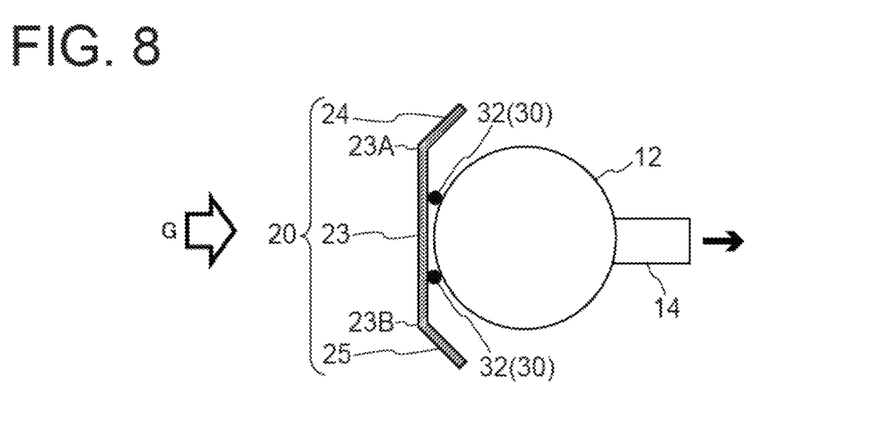
FIG. 8 is a plan view showing a heat shield plate and a fixing part according to another embodiment.

FIG. 8 is a plan view showing a heat shield plate and a fixing part according to another embodiment.

In some embodiments, for example as illustrated in FIG. 8, the heat shield plate 20 may include a first flat plate portion 23 along a direction intersecting the flow direction of the flue gas G as viewed from the extension direction of the header pipe 12, a second flat plate portion 24 that is continuous with one end 23A of the first flat plate portion 23 in the direction intersecting the flow direction and is inclined downstream with respect to the flow direction from the one end 23A, and a third flat plate portion 25 that is continuous with the other end 23B of the first flat plate portion 23 in the direction intersecting the flow direction and is inclined downstream with respect to the flow direction from the other end 23B.

More specifically, for example, the first flat plate portion 23 may be arranged such that the transverse direction thereof is perpendicular to the pipe wall of the duct that constitutes the flue gas passage 2.

In other words, the heat shield plate 20 may have a U-shape or channel shape with both ends in the width direction (transverse direction) intersecting the flow direction of the flue gas G inclined downstream in the flow direction of the flue gas G, as viewed from the extension direction of the header pipe 12. Further, the heat shield plate 20 may be symmetrically arranged with respect to an imaginary line passing through the pipe axis of the header pipe 12 along the flow direction of the flue gas, for example.

Thus, with the configuration in which both ends of the heat shield plate 20 in the width direction intersecting the flow direction are inclined downstream in the flow direction of the flue gas G, since the second flat plate portion 24 and the third flat plate portion 25 are inclined downstream in the flow direction so as to expand downstream in the flow direction, it is possible to reduce the pressure loss of the flue gas G due to the heat shield plate 20 compared with the heat shield plate 20 that extends only in one direction (transverse direction) intersecting the flow direction of the flue gas G, for example.

In any one of the above configurations, in some embodiments, for example as illustrated in FIGS. 2 to 8, the heat shield plate 20 may have a greater width than the header pipe 12 in a direction perpendicular to the flow direction of the flue gas G and to the extension direction of the header pipe 12. The heat shield plate 20 may be disposed over the entire extension range of the header pipe 12 in the extension direction of the header pipe 12.

In other words, the heat shield plate 20 may have a size equal to or larger than the header pipe 12 at least in the transverse direction, and may be configured to cover the entire header pipe 12 as viewed from upstream in the flow direction of the flue gas G.

Thus, when the heat shield plate 20 is disposed upstream of the header pipe 12 and close to the header pipe 12 in the flow direction of the flue gas G such that the entire header pipe 12 is hidden from the flow of the flue gas G, the amount of flue gas G that directly impinges on the header pipe 12 in the passage of the flue gas G can be significantly reduced. Accordingly, heat transferred to the header pipe 12 from the flue gas G, which is generally hotter than the reducing agent flowing in the header pipe 12, can be significantly reduced.

Figure 9:
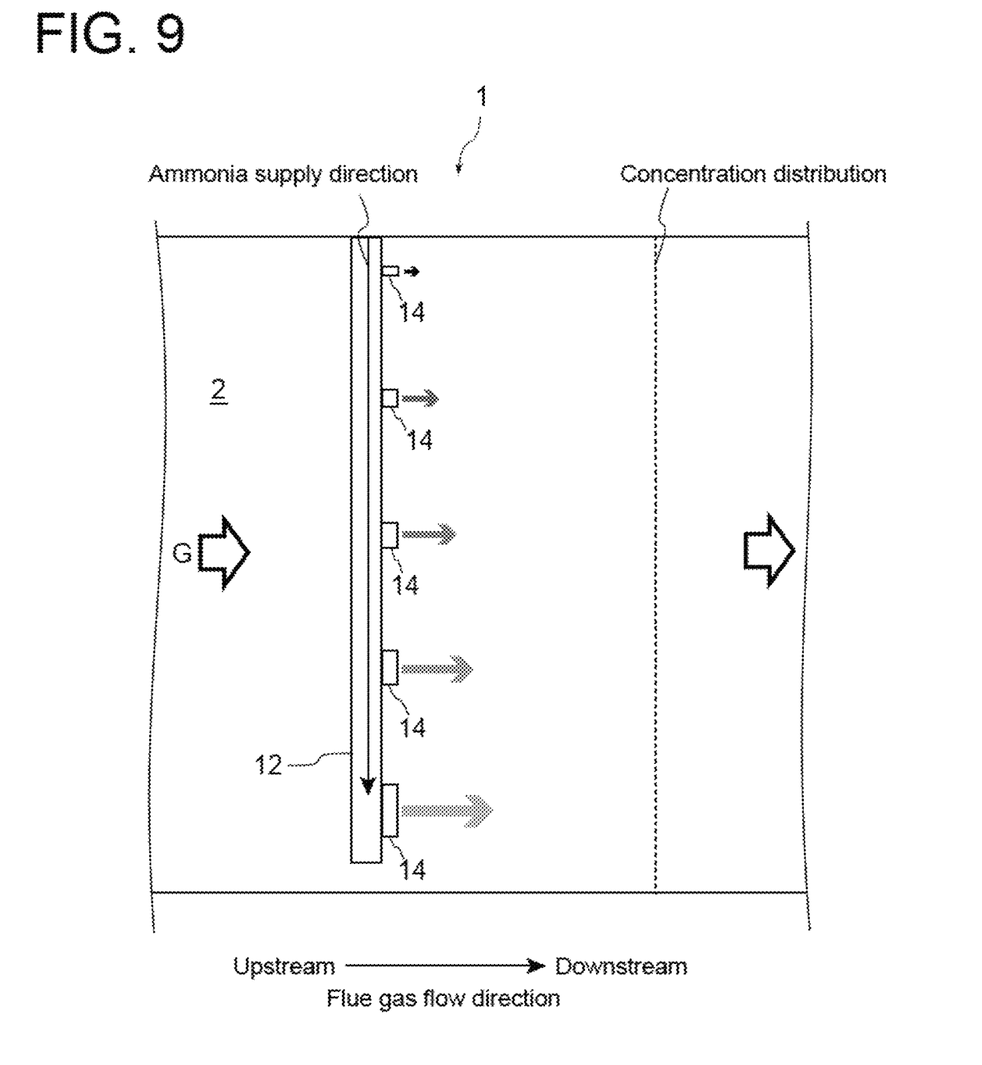
FIG. 9 is a schematic diagram of an injection nozzle according to another embodiment.

FIG. 9 is a schematic diagram of an injection nozzle according to another embodiment.

In any one of the above configurations, in some embodiments, for example as illustrated in FIG. 9, the plurality of injection nozzles 14 may include a first injection nozzle 14A, and a second injection nozzle 14B disposed downstream of the first injection nozzle 14A with respect to the passage direction of the reducing agent in the extension direction of the header pipe 12 and having a larger nozzle diameter than a nozzle diameter of the first injection nozzle 14A.

In other words, the plurality of injection nozzles 14 is configured such that an injection nozzle 14 disposed on the downstream side has a larger nozzle diameter. Further, for example, when the header pipe 12 has the distal end 12B in the flue gas passage 2, the nozzle diameter of the injection nozzle 14 (second injection nozzle 14B) disposed on the distal end 12B side may be set larger than the nozzle diameter of the injection nozzle 14 (first injection nozzle 14A) disposed on the proximal end 12A side of the header pipe 12 in the extension direction of the header pipe 12.

Thus, with the configuration in which the nozzle diameter of the injection nozzle 14 disposed on the downstream side is larger than that of the injection nozzle 14 disposed on the upstream side with respect to the passage direction of the reducing agent in the header pipe 12, a larger amount of ammonia can be injected into the flue gas passage 2 on the downstream side than on the upstream side in the passage direction of the reducing agent in the header pipe 12. As a result, even if ammonia passing through the header pipe 12 is heated by the heat of the flue gas G, and the concentration of ammonia on the downstream side is lower than that of ammonia on the upstream side, the amount of ammonia injected from the upstream injection nozzle 14 (first injection nozzle 14A) and the amount of ammonia from the downstream injection nozzle 14 (second injection nozzle 14B) can be equalized. Thus, the concentration distribution of ammonia injected from the injection nozzles 14 can be equalized in a direction intersecting the flow direction of the flue gas G.

In any one of the above configurations, in some embodiments, at least one of the header pipe 12 or the heat shield plate 20 may be configured to have a higher thermal conductivity on the downstream side than on the upstream side with respect to a passage direction of the reducing agent in the extension direction of the header pipe 12. For example, when the header pipe 12 has the distal end 12B in the flue gas passage 2, it may be configured such that the distal end 12B side has a higher thermal conductivity than the proximal end 12A side.

Thus, when at least one of the header pipe 12 or the heat shield plate 20 is configured to have a higher thermal conductivity on the distal end 12B side than on the proximal end 12A side, more heat is transferred to ammonia circulating in the header pipe 12 on the proximal end 12A, while less heat is transferred as it approaches the distal end 12B, so that the temperature difference of ammonia in the extension direction of the header pipe 12 can be reduced.

The present invention is not limited to the embodiments described above, but includes modifications to the embodiments described above, and embodiments composed of combinations of those embodiments.

For example, in the above-described embodiments, the boiler system 100, to which the reducing agent supply device 10 of the present disclosure is applied, includes the coal-fired boiler 4. However, the boiler 4 may be a boiler that uses biomass, petroleum coke, or petroleum residue as solid fuel, for example. Alternatively, the boiler may be an oil-fired boiler that use heavy oil, not limited to fuel gas. Further, even gas (byproduct gas) may be used as fuel. It can also be applied to mixed firing of these fuels.

The boiler 4 may be, for example, a heat recovery steam generator (HRSG) or a gas turbine.

REFERENCE SIGNS LIST

1 Denitration device
2 Flue gas passage (Passage/Flue gas duct)
3 SCR catalyst (Denitration catalyst)
4 Boiler
5 Furnace
6 Duct
10 Reducing agent supply device
12 Header pipe
12A Proximal end
12B Distal end
12C Upstream end
14 Injection nozzle
14A First injection nozzle
14B Second injection nozzle
20 Heat shield plate
20A One end portion
20B Other end portion
21 One-side flat plate portion
21A One end
21B Other end
22 Other-side flat plate portion
23 First flat plate portion
24 Second flat plate portion
25 Third flat plate portion
30 Fixing part
32 Spot weld part
34 Band part
100 Boiler system
G Flue gas

The invention claimed is:

1. A reducing agent supply device for supplying a reducing agent to a portion of a passage for a fine gas upstream of a SCR catalyst, the reducing agent supply device comprising:
   at least one header pipe extending in the passage and configured to allow the reducing agent to pass through;
   a plurality of injection nozzles disposed on the header pipe at intervals along an extension direction of the header pipe and configured to inject the reducing agent into the passage;
   a heat shield plate disposed on an upstream side of the header pipe with respect to a flow direction of the flue gas and having a longitudinal direction along the extension direction of the header pipe; and
   at least one fixing part contacting each of the heat shield plate and the header pipe and fixing the heat shield plate to the header pipe,
   wherein the at least one fixing part is disposed in at least one position in the extension direction of the header pipe.

2. The reducing agent supply device according to claim 1, wherein the at least one fixing part includes at least one spot weld part fixing the heat shield plate and the header pipe with a spot-like welding mark.

3. The reducing agent supply device according to claim 1, wherein the at least one fixing part includes at least one band part fixing the heat shield plate and the header pipe by connecting one end portion and another end portion of the heat shield plate in a transverse direction so as to span the header pipe.

4. The reducing agent supply device according to claim 1, wherein the heat shield plate is formed in a flat plate shape.

5. The reducing agent supply device according to claim 1, wherein the heat shield plate includes:
   a one-side flat plate portion that is inclined to one side intersecting the flow direction as viewed from the extension direction of the header pipe; and
   an other-side flat plate portion that is inclined to another side intersecting the flow direction and has an upstream end, with respect to the flow direction, continuous with the one-side flat plate portion as viewed from the extension direction of the header pipe.

6. The reducing agent supply device according to claim 1, wherein the heat shield plate is formed in an arc shape that is convex upstream with respect to the flow direction.

7. The reducing agent supply device according to claim 1, wherein the heat shield plate includes:
   a first flat plate portion along a direction intersecting the flow direction as viewed from the extension direction of the header pipe;
   a second flat plate portion that is continuous with one end of the first flat plate portion in the direction intersecting the flow direction and is inclined downstream with respect to the flow direction from the one end; and
   a third flat plate portion that is continuous with another end of the first flat plate portion in the direction intersecting the flow direction and is inclined downstream with respect to the flow direction from the another end.

8. The reducing agent supply device according to claim 1, wherein the heat shield plate has a greater width than the header pipe in a direction perpendicular to the flow direction and to the extension direction of the header pipe.

9. The reducing agent supply device according to claim 1, wherein the at least one header pipe includes a plurality of header pipes arranged at intervals in a direction perpendicular to the flow direction and to the extension direction of the header, pipe.

10. The reducing agent supply device according to claim 1, wherein the plurality of injection nozzles includes a first injection nozzle, and a second injection nozzle disposed downstream of the first injection nozzle with respect to a passage direction of the reducing agent in the extension direction of the header pipe, the second injection nozzle having a larger nozzle diameter than a nozzle diameter of the first injection nozzle.

11. The reducing agent supply device according to claim 1, wherein at least one of the header pipe of the heat shield plate is configured to have a higher then real conductivity on a downstream side than on an upstream side with respect to a passage direction of the reducing agent in the extension direction of the header pipe.

12. A denitration device, comprising:
the reducing agent supply device according to claim 1; and
a SCR catalyst configured to remove a NOx component in a flue gas by a reducing agent supplied from the reducing agent supply device.

* * * * *